(12) United States Patent
Bates et al.

(10) Patent No.: US 6,978,399 B2
(45) Date of Patent: Dec. 20, 2005

(54) DEBUG THREAD TERMINATION CONTROL POINTS

(75) Inventors: Cary L. Bates, Rochester, MN (US); Steven G. Halverson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 555 days.

(21) Appl. No.: 10/241,904

(22) Filed: Sep. 12, 2002

(65) Prior Publication Data

US 2004/0054944 A1    Mar. 18, 2004

(51) Int. Cl.[7] .............................................. G06F 11/30

(52) U.S. Cl. ...................................... 714/34; 717/125

(58) Field of Search .............................. 714/34, 35, 38; 717/125, 129; 712/227, 231

(56) References Cited

U.S. PATENT DOCUMENTS

| | | | |
|---|---|---|---|
| 5,432,933 A * | 7/1995 | Janicek ....................... 718/100 |
| 5,632,032 A * | 5/1997 | Ault et al. ................... 718/100 |
| 5,978,838 A * | 11/1999 | Mohamed et al. ........... 709/208 |
| 6,026,362 A * | 2/2000 | Kim et al. ....................... 705/1 |
| 6,226,787 B1 * | 5/2001 | Serra et al. ................... 717/125 |
| 6,378,125 B1 * | 4/2002 | Bates et al. .................. 717/129 |
| 6,480,818 B1 * | 11/2002 | Alverson et al. .............. 703/26 |
| 6,681,384 B1 * | 1/2004 | Bates et al. .................. 717/129 |
| 2002/0162053 A1 * | 10/2002 | Os .................................. 714/38 |

* cited by examiner

Primary Examiner—Scott Baderman
(74) Attorney, Agent, or Firm—Moser Patterson & Sheridan LLP

(57) ABSTRACT

Method, apparatus and article of manufacture for determining thread termination in a debugging environment. One embodiment provides a method of determining thread termination within a debugging environment, comprising: from a debugger user interface, receiving a user selection requesting notification of termination of a thread; and invoking the debugger user interface to notify the user of termination of the thread.

9 Claims, 8 Drawing Sheets

DEBUG THREAD TERMINATION CONTROL POINTS

BACKGROUND OF THE INVENTION

1. Field of the Invention

The present invention generally relates to computers and computer software. More specifically, the invention is generally related to determining thread termination in a debugging environment.

2. Description of the Related Art

Locating, analyzing and correcting suspected faults in a computer program is a process known as "debugging." Typically, a programmer uses another computer program commonly known as a "debugger" to debug a program under development.

Conventional debuggers typically support two primary operations to assist a computer programmer. A first operation supported by conventional debuggers is a "step" function, which permits a computer programmer to process instructions (also known as "statements") in a computer program one-by-one, and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before a set of instructions to be analyzed are executed.

To address this difficulty, a second operation supported by conventional debuggers is a breakpoint operation, which permits a computer programmer to identify with a "breakpoint" a precise instruction for which it is desired to halt execution of a computer program during execution. As a result, when a computer program is executed by a debugger, the program executes in a normal fashion until a breakpoint is reached, and then stops execution and displays the results of the computer program to the programmer for analysis.

Typically, step operations and breakpoints are used together to simplify the debugging process. Specifically, a common debugging operation is to set a breakpoint at the beginning of a desired set of instructions to be analyzed, and then begin executing the program. Once the breakpoint is reached, the program is halted, and the programmer then steps through the desired set of instructions line by line using the step operation. Consequently, a programmer is able to quickly isolate and analyze a particular set of instructions without having to step through irrelevant portions of a computer program.

Most breakpoints supported by conventional debuggers are unconditional, meaning that once such a breakpoint is reached, execution of the program is always halted. Some debuggers also support the use of conditional breakpoints, which only halt execution of a program when a variable used by the program is set to a predetermined value at the time such a breakpoint is reached.

Some operating systems, such as UNIX and Windows NT, allow multiple parts, or threads, of one or more processes to run simultaneously. These operating systems are referred to as multi-threaded. This type of parallel processing allows for faster execution of such processes. However, multi-threaded operating systems complicate debugging by making use of breakpoints inefficient. Conventional multi-thread debuggers do not identify the activities and termination of the various control threads. The insight given is limited to listing thread identifiers without any relation to when a thread terminates. The user must often painfully set and hit each of a large number of breakpoints to deduce when a thread terminates. This presumes the user has taken the effort to first determine the possible thread termination points in the code being debugged. Most operating systems have an instruction that causes a thread to terminate normally. However, this termination point can occur in potentially many places within the code. The thread may also terminate abnormally because the code being debugged takes an exception, a machine check occurs, etc. Therefore, the point at which thread termination occurs is unpredictable, making it very difficult and time consuming to set breakpoints in all the possible termination points.

Therefore, a significant need exists for a manner of determining the termination of threads so that multithreaded code can be debugged more readily.

SUMMARY OF THE INVENTION

The present invention generally provides methods, articles of manufacture and apparatus for determining thread termination in a debugging environment.

One embodiment provides a method of determining thread termination within a debugging environment, comprising: from a debugger user interface, receiving a user selection requesting notification of termination of a thread; and invoking the debugger user interface to notify the user of termination of the thread.

Another embodiment provides a method of determining thread termination within a debugging environment, comprising: associating a breakpoint with a thread of a multithreaded program; and firing the breakpoint upon termination of the thread.

Yet another embodiment provides a computer readable medium containing a debug program which, when executed, performs any of the methods of the invention.

Yet another embodiment provides a computer readable medium containing a debug program user interface which, when executed, performs an operation for determining thread termination within a debugging environment. The debug program user interface comprises user interface code configured to receive a user selection requesting notification of termination of a thread; and user interface code configured to display a user notification of termination of the thread.

Still another embodiment provides a system, comprising a memory containing at least operating system code, debugging code, and multithreaded code; and a processor. When executing contents of the memory, the processor is configured to: execute threads of the multithreaded code; initiate termination of a thread; and initiate a user notification of the thread termination via a debug user interface of the debugging code.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 7 is an illustrative example of a user interface depiction, consistent with the debug user interface of FIG. 2, showing a menu window from which a thread termination control point may be established.

FIG. 8 is an illustrative example of the user interface depiction of FIG. 7 showing the system response to a thread termination control point being encountered during execution of the computer program.

DETAILED DESCRIPTION OF THE PREFERRED EMBODIMENTS

Figure 1:
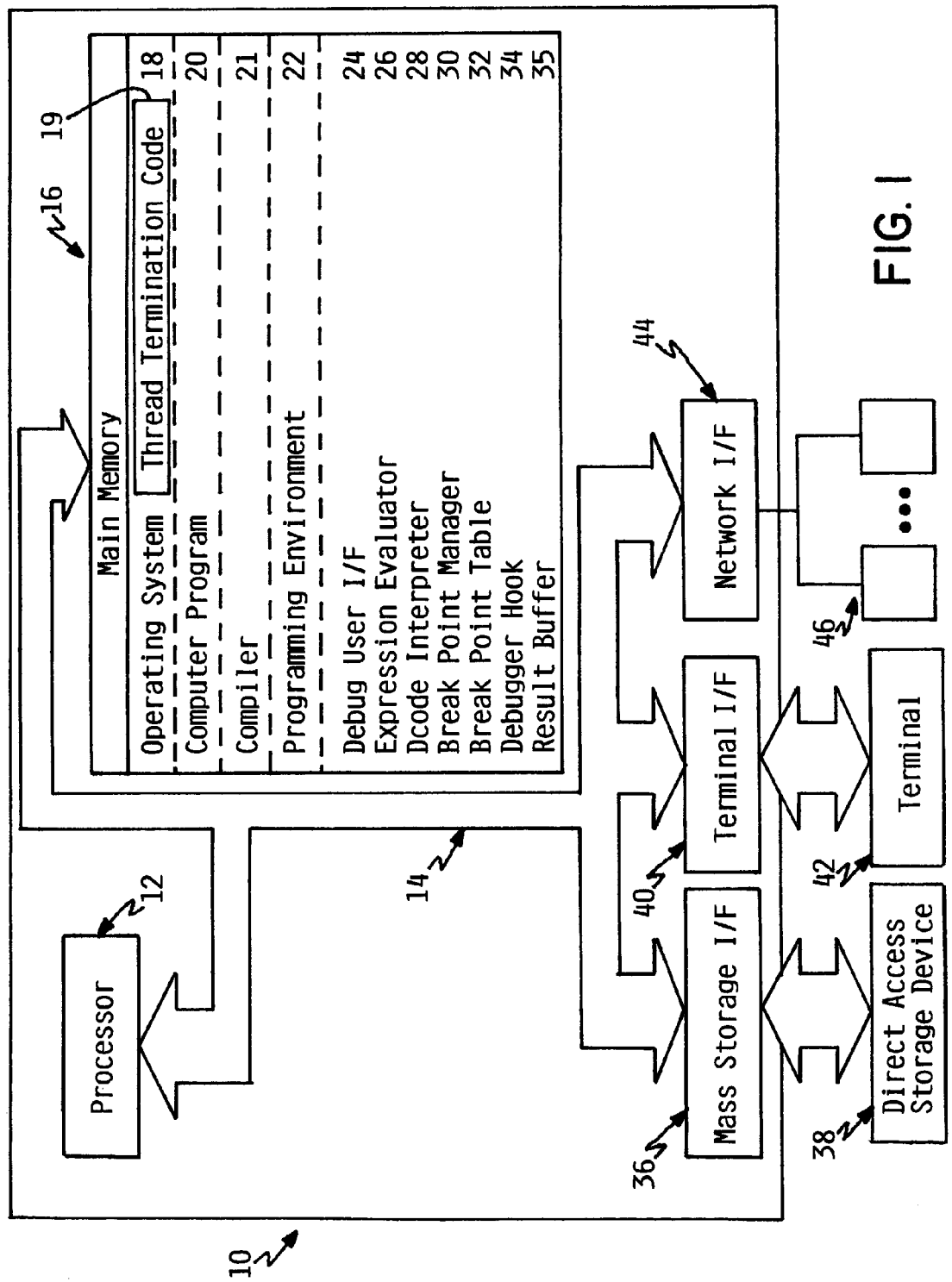
FIG. 1 is an exemplary computer system consistent with one embodiment of the invention.

The present invention provides methods, articles of manufacture and apparatus for determining thread termination in a debugging environment.

One embodiment of the invention is implemented as a program product for use with a computer system such as, for example, the computer system shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, object, module or sequence of instructions will be referred to herein as "computer programs," simply "programs", "code" or "code portion" or any other suitable language. The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.).

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Debugging multi-threaded code (e.g., applications and other computer programs) is aided by identifying terminating threads. For instance, after a thread is terminated during program execution, program execution is halted and the user may be notified of the thread termination. In one embodiment, thread termination is determined by the provision of an inventive thread termination control point (also referred to herein as an internal breakpoint), which is associated with one or more threads. The thread termination control point may be similar to conventional breakpoints in that encountering the thread termination control point results in a trap firing, thereby initiating additional processing, which may include determining whether user notification should be performed. More generally, any technique for determining the termination of a thread in a debugging environment is contemplated and within the scope of the invention. Details for other embodiments are described below.

Generally, thread termination control points and breakpoints are both examples of control points, which are generally user-inserted interruptions to program execution. In one embodiment, an invalid instruction is inserted at an address corresponding to a statement used in a program. Thus, the invalid instruction causes a hardware interrupt, also referred to as a system exception. Other control point implementations may be used in the alternative.

Turning to the Drawings, wherein like numbers denote like parts throughout the several views, FIG. 1 illustrates a computer system 10 consistent with the invention. Computer system 10 is shown for a multi-user programming environment that includes at least one processor 12 which obtains instructions, or op codes, and data via a network 14 from a main memory 16. The processor 12 could be a PC-based server, a minicomputer, a midrange computer, a mainframe computer, etc. The main memory 16 includes an operating system 18, a computer program 20, a compiler 21, and a programming environment 22. The programming environment 22 provides a way to debug the computer program 20, or computer code, by providing tools for locating, analyzing and correcting faults. One such tool is thread termination identification. As will be shown below, this thread termination identification tool is provided by the cooperation of a debug user interface 24, expression evaluator 26, dcode interpreter 28, breakpoint manager 30, breakpoint table 32, debugger hook 34, and result buffer 35, which collectively make up a debugger application. In one embodiment, the debugger application is the iSeries System Debugger available from International Business Machines, Inc., of Armonk, N.Y.

To facilitate thread termination identification in one embodiment, the operating system 18 includes thread termination code 19. Generally, the thread termination code 19 is any code invoked to terminate a thread and, in turn, can be used to notify the breakpoint manager 30 of the termination according to one aspect of the invention. In a particular embodiment, the thread termination code 19 is a signal handler (run-time code) which is run before a thread's stack is unwound. Accordingly, the invocation of such code is indicative of the imminent termination of a thread. This functionality is taken advantage of in one embodiment of the invention. Although the thread termination code 19 is shown as part of the operating system 18, more generally, the thread termination code 19 may reside anywhere so long as the aforementioned function is achieved. In one embodiment, the thread termination code 19 is (or is in) a dynamic link library (DLL) file or some other execution packaging method. Further, in one embodiment, the compiler 21 is used to advantage in determining thread termination, as will be described in more detail below.

The computer system 10 could include a number of operators and peripheral systems as shown for example by a mass storage interface 36 operably connected to a direct access storage device 38, by a terminal interface 40 operably connected to a terminal 42, arid by a network interface 44 operably connected to a plurality of networked devices 46. The terminal 42 and networked devices 46 could be desktop or PC-based computers, workstations, or network terminals, or other networked computer systems.

Storage device 38 is DASD (Direct Access Storage Device), although it could be any other storage such as floppy disc drives or optical storage. Although storage 38 is shown as a single unit, it could be any combination of fixed and/or removable storage devices, such as fixed disc drives, floppy disc drives, tape drives, removable memory cards, or optical storage. Main memory 16 and storage device 38 could be part of one virtual address space spanning multiple primary and secondary storage devices.

The contents of main memory 16 can be loaded from and stored to the storage device 38 as processor 12 has a need for it. Main memory 16 is any memory device sufficiently large to hold the necessary programming and data structures of the invention. The main memory 16 could be one or a combination of memory devices, including random access memory (RAM), non-volatile or backup memory such as programmable or flash memory or read-only memory (ROM). The main memory 16 may be physically located in another part of the computer system 10. While main memory 16 is shown as a single entity, it should be understood that memory 16 may in fact comprise a plurality of modules, and that main memory 16 may exist at multiple levels, from high speed registers and caches to lower speed but larger DRAM chips.

For purposes of the invention, computer system 10 may represent practically any type of computer, computer system or other programmable electronic device, including a client computer, a server computer, a portable computer, an embedded controller, etc. The computer system 10 may be a standalone device or networked into a larger system.

Figure 2:
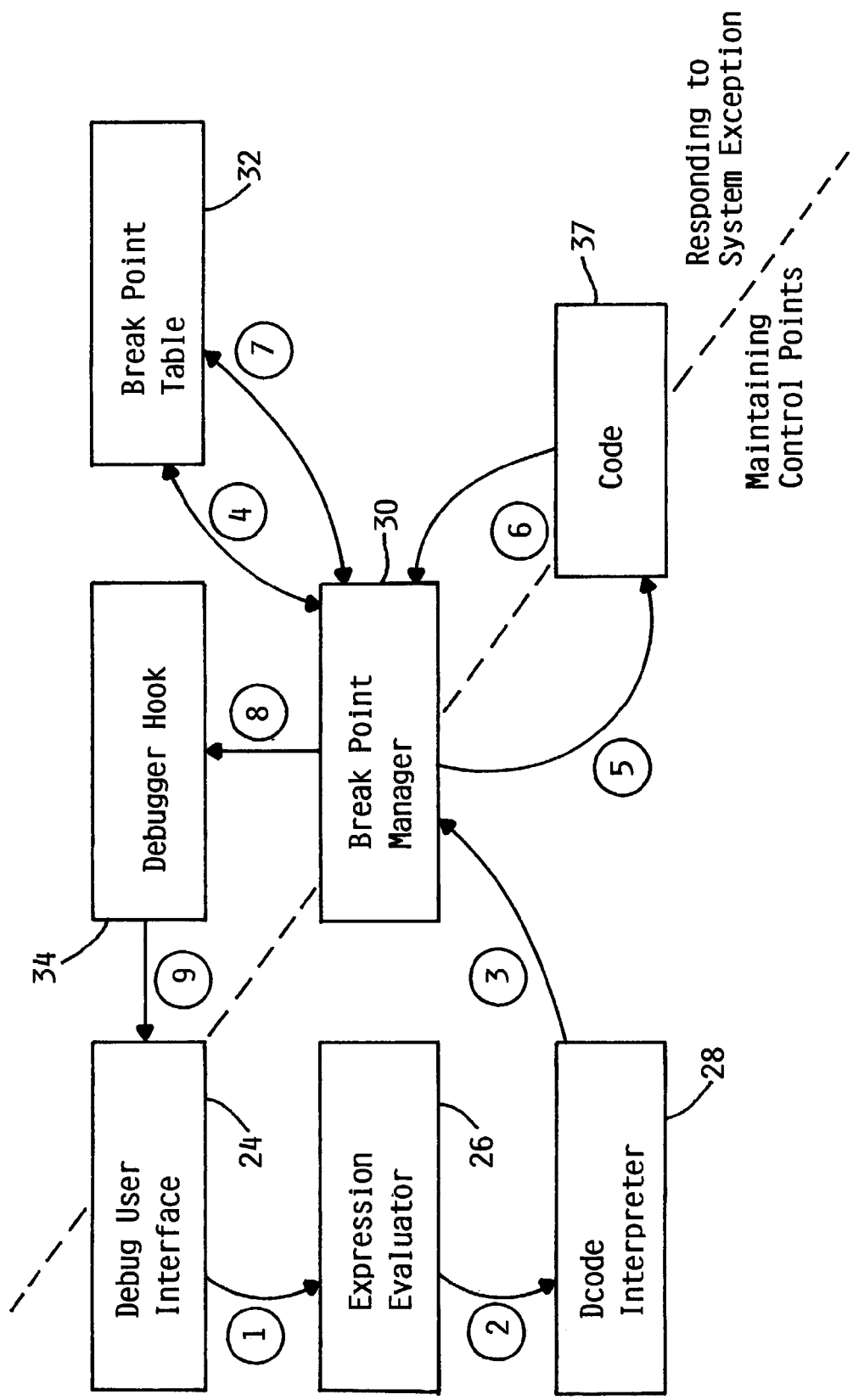
FIG. 2 is a block diagram of an exemplary software environment for the computer system of FIG. 1.

Referring to FIG. 2, an exemplary software environment is shown for the computer system 10 of FIG. 1. Specifically, thread termination identification capability is illustrated in block diagram form, with the elements shown that contribute to maintaining (e.g., creating and deleting) control points and to responding to a system exception. The debug user interface 24, which may be a third-party debugging program, is shown initiating the process, providing at Phase 1 any control points to be established. For example, a debugger command is made setting a thread termination identification control point or a breakpoint at a given statement number or a variable. At Phase 2, this debugger command is parsed by the expression evaluator 26 that uses a table that was produced by the compiler 21 to map the line number in the debugger command to the actual physical storage address in memory 16. The dcode interpreter 28 at Phase 3 passes on the control point information to the breakpoint manager 30, which in turn updates the breakpoint table 32 at Phase 4. At Phase 5, the dcode interpreter 28 runs a dcode program to control the breakpoint manager 30 to set the control points in some code portion 37. In one embodiment, code portion 37 is representative of the program 20 and/or the thread termination code 19, in which control points may be set.

After the control points are set, user provides an input that resumes execution of the program 20. As represented at Phase 6, execution of the program 20 results in an encounter of a control point. In the illustrative embodiment, this is accomplished by an invalid statement in the dcode program causing a system exception, similar to a breakpoint. An interrupt handler, or similar means, passes information regarding the exception or interrupt to the breakpoint manager 30. The breakpoint manager 30 references and updates the breakpoint table 32 at Phase 7 as required in order to determine what type of control point was encountered and the associated processing. Then, at Phase 8, the breakpoint manager 30 utilizes the debugger hook 34 in order to obtain debugger commands, especially when a breakpoint has halted program execution. The debugger hook 34 prompts the debug user interface 24 at Phase 9. The additional step of the debugger hook 34 is illustrated for instances where an interface is required between the user interface 24 and the other portions of the programming environment 22. The debugger hook 34 utilizes the result buffer 35 to cache data for the debug user interface 24.

Figure 3:
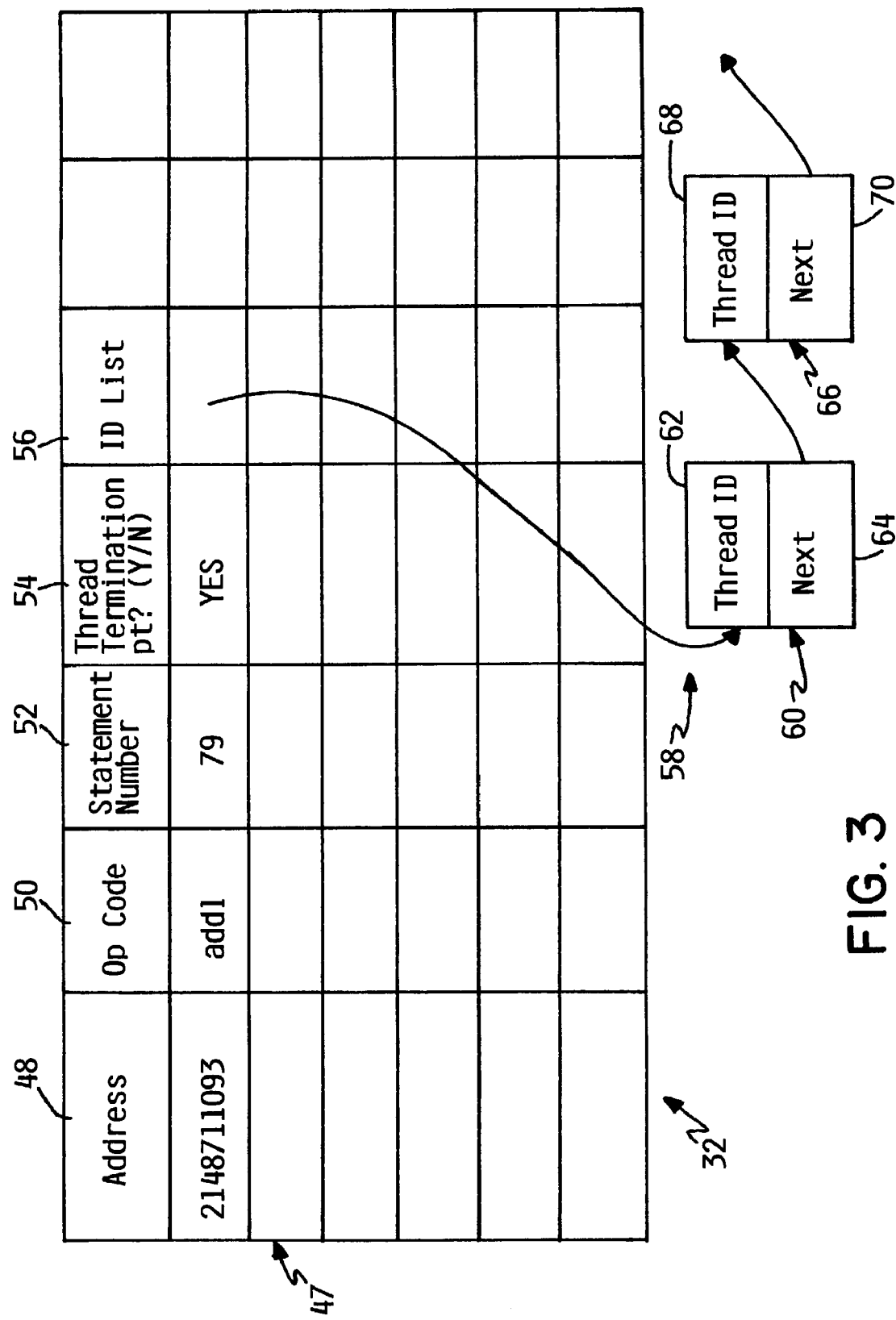
FIG. 3 is a data structure depiction for the breakpoint table of FIGS. 1 and 2.

Referring to FIG. 3, an exemplary data structure for the breakpoint table 32 is shown. Each record 47 in the table includes fields of an address 48, op code 50, statement number 52, thread termination control point flag 54, and pointer 56. The ID list pointer 56 is part of an identification list 58 ("ID list"), wherein the ID list pointer 56 points to a first thread ID record 60, composed of a thread ID 62 and a pointer 64. The pointer 64 points to the next thread ID associated with the address, which in this instance is a second thread ID record 66 composed of a thread ID field 68 and a pointer 70. The linked ID list 58 is terminated by a NULL value either in the ID list pointer 56 for no associated thread identifiers or in a subsequent pointer 52, 58 for the last thread ID record 60, 66. Illustratively, the threads (or singular thread) identified in the ID list 58 are user selected threads for which the user desires to be notified upon termination of the thread(s).

Figure 4:
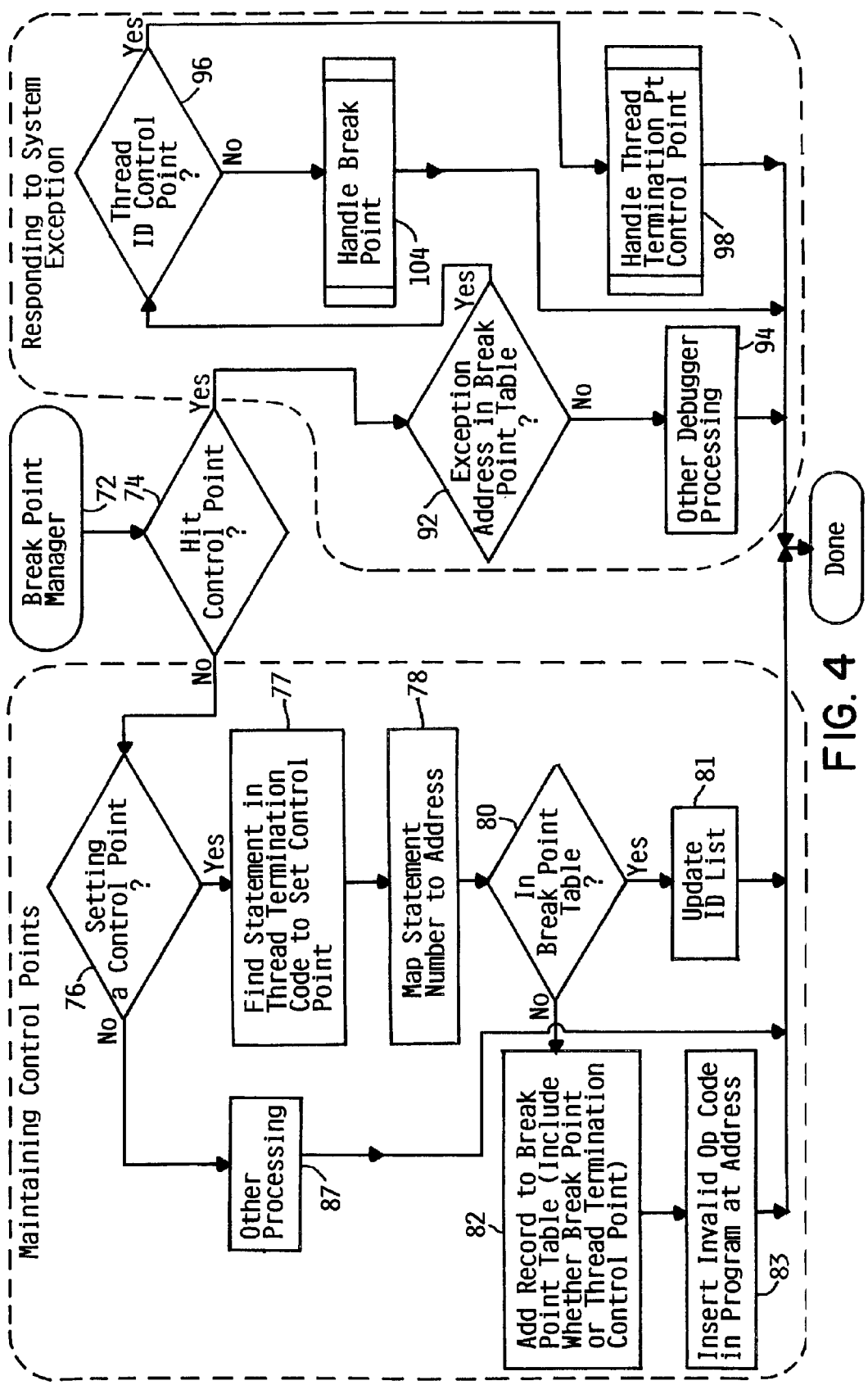
FIG. 4 is a flow diagram for a breakpoint manager routine implemented on the computer system of FIG. 1.

Referring to FIG. 4, a breakpoint manager routine 72 is illustrated wherein control point operations are handled, based on whether the input is due to a control point (i.e., responding to a system exception) or a debugger command (block 74). If the input was not a hit control point in block 74, then a determination is made as to whether a thread termination control point is to be set (block 76). In one embodiment, setting a thread termination control point includes passing in a thread ID corresponding to a user-selected thread. One embodiment illustrating the manner in which a user selects thread termination notice for one or more threads will be described below with reference to FIGS. 7 and 8. If a thread termination control point is not being set, the appropriate processing is handled (block 87). If, however, a thread termination control point is to be set (block 76), then the program element (e.g., statement number) in the thread termination code 19 on which the thread termination control point is to be set is located (block 77). Then, the statement number for which the thread termination control point is to be associated is mapped to a physical address (block 78). A determination is then made as to whether this address is already in the breakpoint table (block 80). Referring to FIG. 3, this means searching each address field 48 to see if the address is included in an address field 48. Returning to FIG. 4, if the address is found in block 80, then the ID list 58 is updated with the user-selected thread ID for which the user is requesting notification (block 81). The routine 72 is then done. If, however, the address is not currently in the breakpoint table 32, then a record 47 is added (block 82). Adding the record 47 includes indicating that the control point being set is a thread termination control point, such as by setting high the thread termination control point flag 54 in FIG. 3. Next, the control point is set at the appropriate location in the appropriate code, illustratively the thread termination code 19. In the illustrative embodiment, setting the control point means inserting an invalid instruction at the address of the statement (block 84) while retaining the original op code in the op code field 50 of the breakpoint table 32. The breakpoint routine 72 is then done for this operation. Note that similar processing may be performed at block 87 when setting conventional breakpoints. Thus, it is understood that while only one record 47 for a thread termination control point is shown in FIG. 3, the breakpoint table 32 may include a plurality of records for conventional breakpoints.

Note that in the illustrative embodiment, a thread termination control point need only be set once in the thread termination code 19 (block 84). Subsequent user requests for thread termination notification require only that the thread ID list 58 is updated with the appropriate thread ID. In other embodiments, if all thread termination points have been removed or completed the breakpoint can be removed (after which it would need to be reestablished). In still other embodiments, the breakpoint may be retained with an empty ID list, implying that the breakpoint is only set once.

Returning to block 74 for the case when the breakpoint routine 72 is responding to hitting a control point (block 74), then a determination is made as to whether the address causing the system exception is contained in the breakpoint table 32 (block 92). If the address is not in the breakpoint table 32, other conventional debugging processing is accomplished (block 94) and routine 72 is done for this operation. For example, the invalid instruction could be a fault in the program code for which an appropriate warning is generated for the user. If in block 92, the address for the exception is found in the breakpoint table, then determination is made as to whether this address is associated with a thread ID control point (block 96). If the exception is a thread termination control point, then the thread termination control point is handled (block 98). If the exception is not a thread termination control point in block 96, then the control point is handled as a conventional breakpoint (block 104).

It should be appreciated that routine 72 is but one suitable implementation of a breakpoint manager 30 consistent with the invention. Other implementations may use, for example, a procedural model. In general, the implementation of a programming environment or other computer program consistent with the invention may utilize any known programming model, and it will be appreciated that such an implementation would be well within the capabilities of one of ordinary skill in the art having benefit of the disclosure presented herein.

Figure 5:
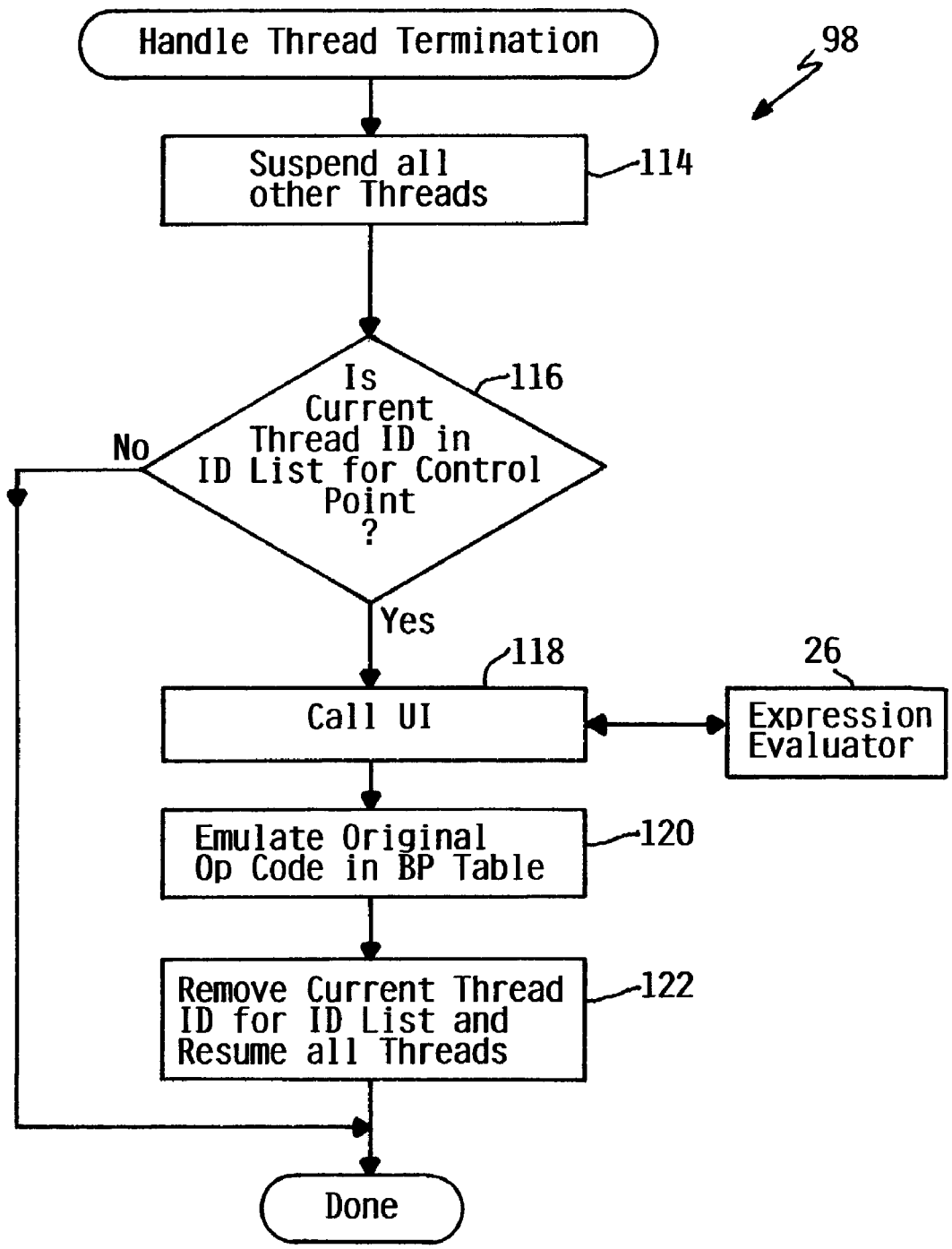
FIG. 5 is a flow diagram of the thread termination control point routine referenced in the breakpoint manager routine of FIG. 4.

Referring to FIG. 5, one embodiment of the thread termination control point handling routine 98 referenced in FIG. 4 is illustrated. First, all executing threads are suspended (block 114). Next, a determination is made as to whether the terminated thread is one which the user has selected to be monitored. Illustratively, this is done by examining the ID list 58 (block 100). If the current thread ID (i.e., the ID for the terminated thread) is not in the ID list 58, then the routine is done. If the current thread ID is in the ID list 58, then the debug user interface 24 is called to see if further debug commands are to be performed (block 118). This interaction with the debug user interface 24 may occur using the debugger hook 34 as previously discussed. The expression evaluator 26 interacts with the debug user interface 24 so that these higher level functions may be accomplished prior to recommencing activities by the handle breakpoint routine 104. Typically, after this user interaction, the original op code stored in the breakpoint table 32 for the control point is emulated so that program execution can recommence (block 120) and all threads are unsuspended (block 122). In addition, the ID of the terminating thread may be removed from the thread ID list 58. However, it is well-known that many operating systems will not reuse a thread ID after termination of the corresponding ID. Accordingly, this step may be unnecessary. Routine 98 is then done.

Figure 6:
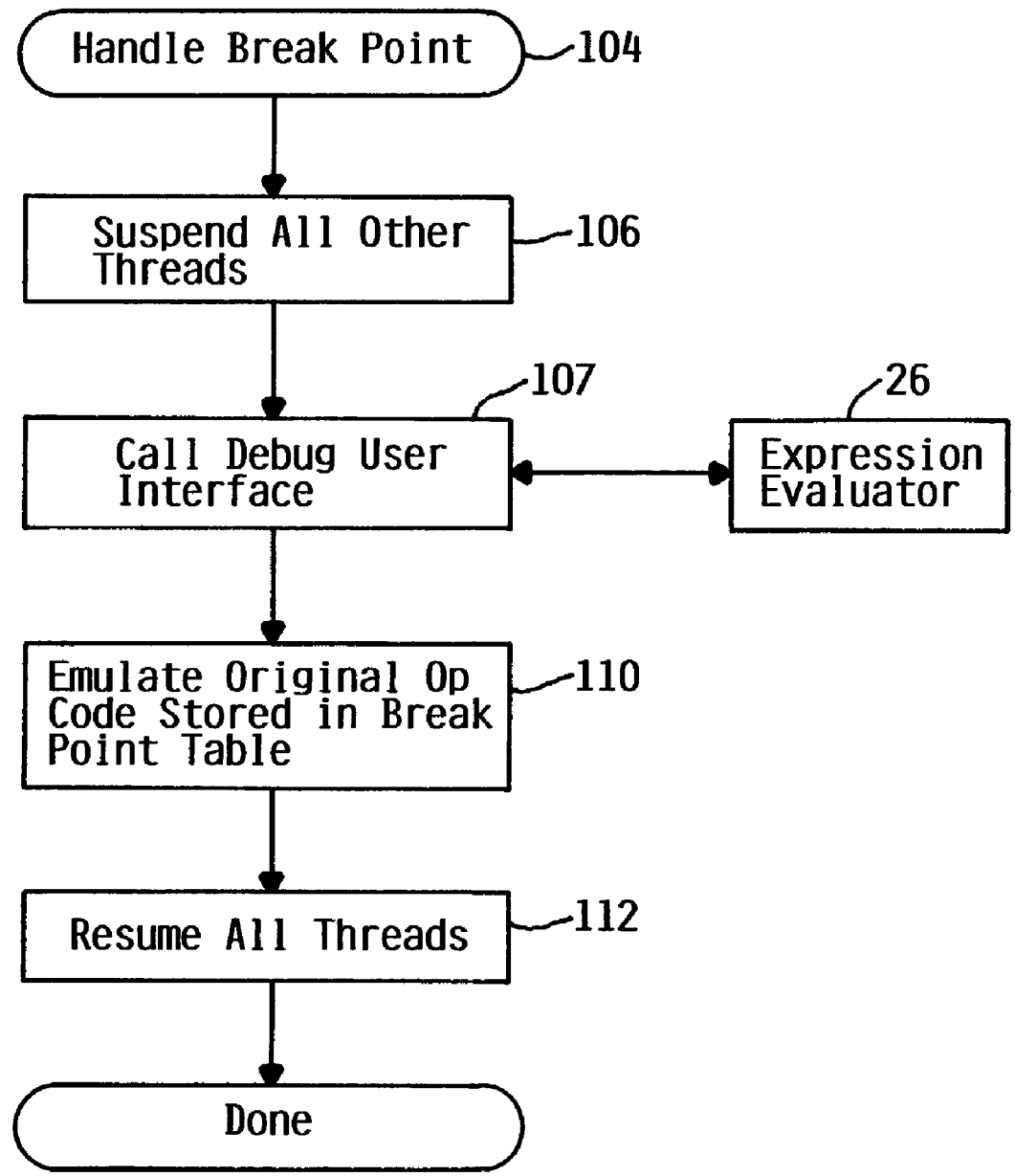
FIG. 6 is a flow diagram for the breakpoint handling routine referenced in the breakpoint manager routine of FIG. 4.

Referring to FIG. 6, one embodiment of the breakpoint routine 104 referenced in FIG. 4 is illustrated. First, all executing threads are suspended (block 106). Next, the debug user interface 24 is called to see if further debug commands are to be performed (block 107). This interaction with the debug user interface 24 may occur using the debugger hook 34 as previously discussed. The expression evaluator 26 interacts with the debug user interface 24 so that these higher level functions may be accomplished prior to recommencing activities by the handle breakpoint routine 104. Typically, after this user interaction, the original op code stored in the breakpoint table 32 for the control point is emulated so that program execution can recommence (block 110) and all threads unsuspended (block 112). Routine 104 is then done.

Figure 7:
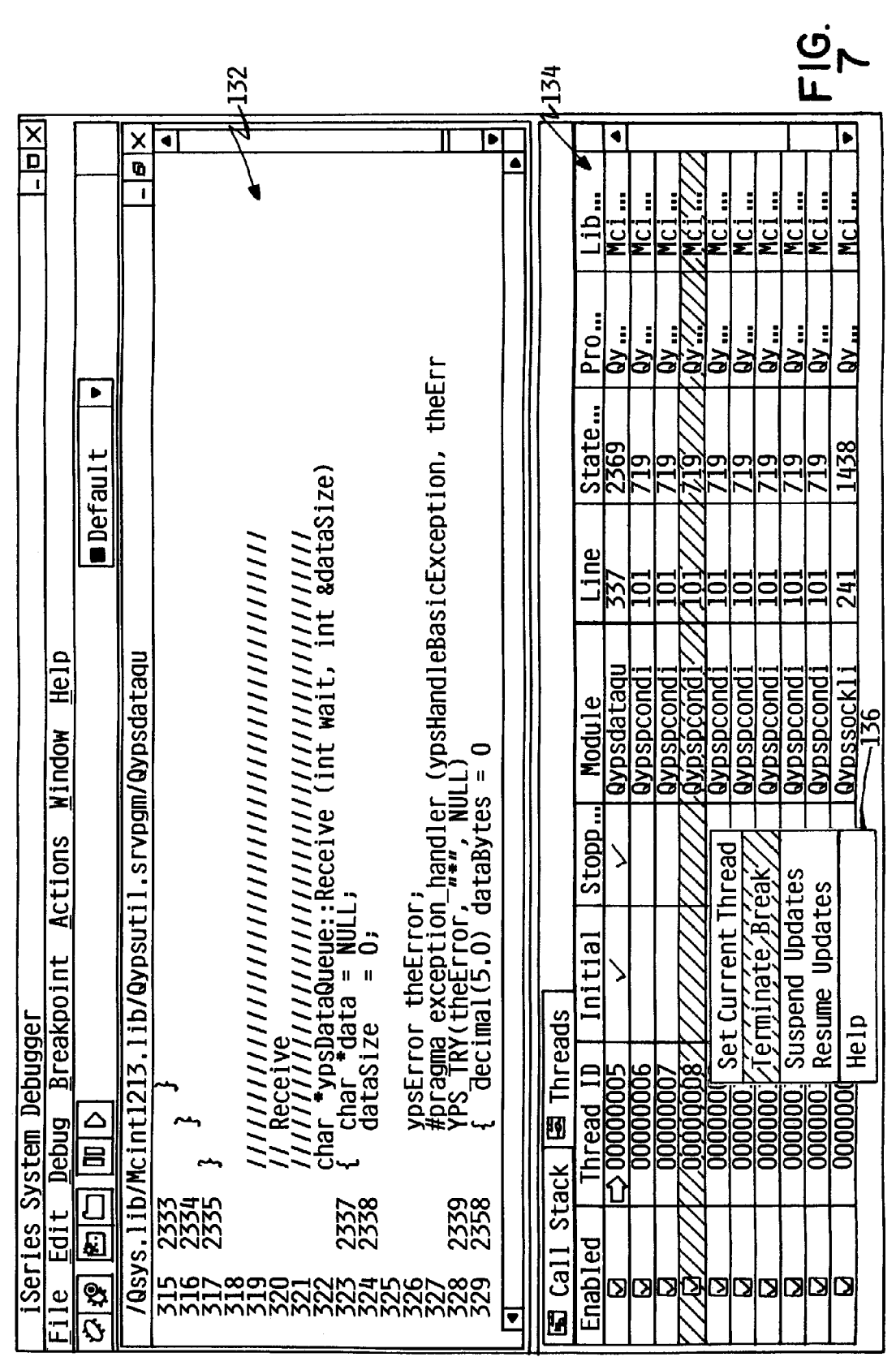

Referring to FIG. 7, an illustrative example is provided of a user interface screen 130 (of the debug user interface 24) consistent with the invention. Illustratively, the user interface screen 130 represents a graphical user interface having a plurality of graphical elements (e.g., buttons) to facilitate operation. The user interface screen 130 is shown with two window panels: a source code panel 132 and a threads panel 134. Of course, the user interface screen 130 may be configured with any number of panels to display various types of information. In order to set a thread termination control point one embodiment provides a menu window 136, which is visible over the threads panel 134. By way of example, the menu window 136 may be invoked by first highlighting the desired thread ID in the threads panel 134, in this case 00000008, and then right clicking a mouse button. Once the menu window 136 is visible, the user selects the "terminate break" option to set a thread termination control point in the thread termination code 19 (if not already set) and add the thread ID to the ID list 58. This process may be repeated for a plurality of threads, each having unique thread IDs.

Figure 8:
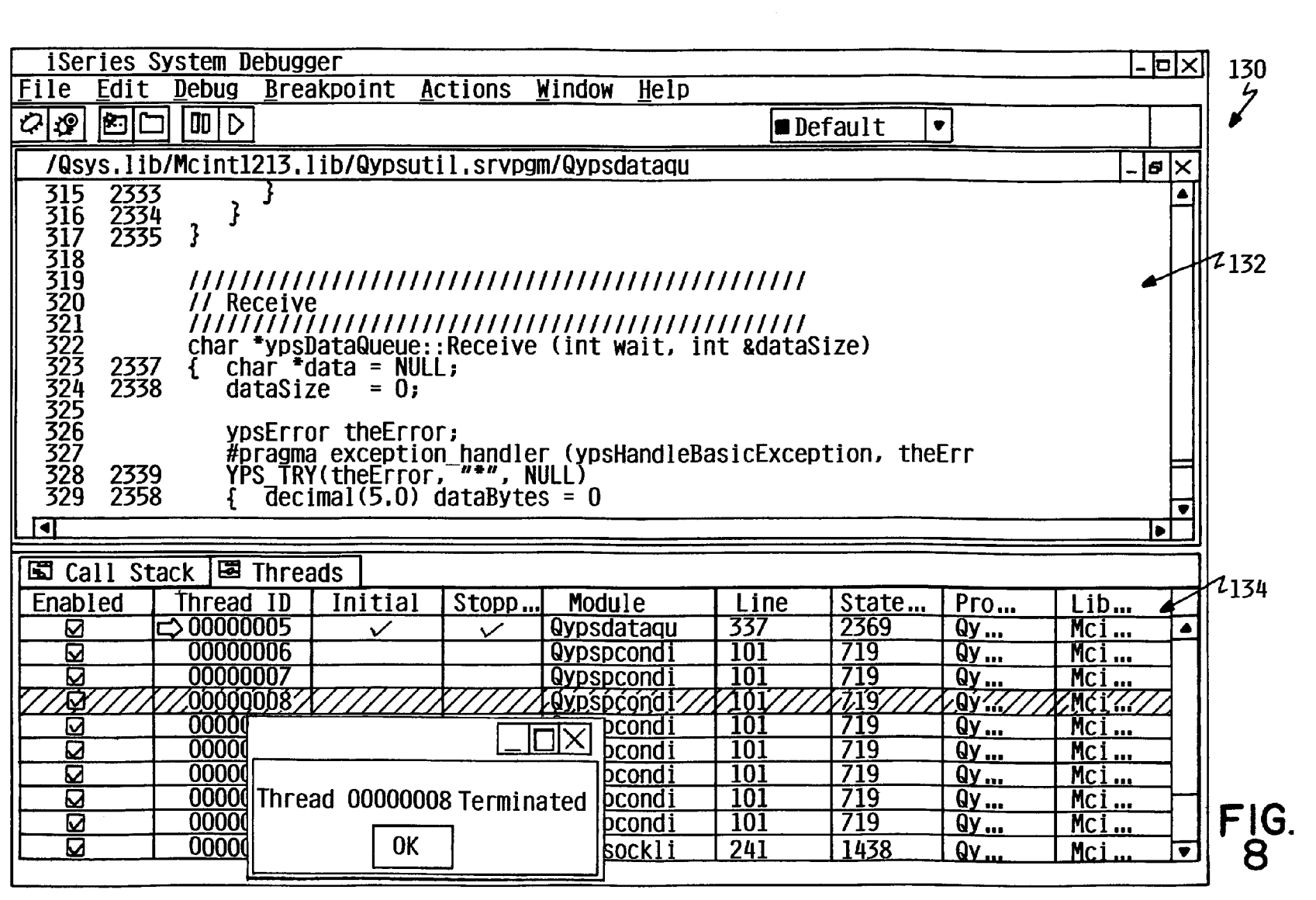

Referring to FIG. 8, a depiction of the user interface screen 130 is shown immediately after a thread in the thread ID list 58 is terminated. A dialog box 138 shown over the thread panel 134 indicates that the terminated thread is thread ID 0000008. In one embodiment, the user is notified in this manner when the any of the threads contained in the thread ID list 58 is terminated. For each termination, the user may remove the thread ID of the terminated thread (block 122 of FIG. 5) and examine the state of variables and perform other debugging activities.

Various modifications may be made to the illustrative embodiments consistent with the invention. For example, the illustration of a program code listing and graphical user interface is exemplary. However, command-line user interfaces and other similar user interface mechanisms may be used consistent with the invention.

In the foregoing embodiments, a single internal breakpoint to set within the thread termination code 19. In an alternative embodiment, more than one of these internal breakpoints is set. For instance, an internal breakpoint may be set on every statement which is known to the compiler 21 to result in thread termination. Acquiring and using such information from the compiler 21 is readily achieved by persons skilled in the art.

In addition, thread termination identification may include identifying terminating threads by observing an address or variable which is affected only immediately prior to termination. In this instance, a control point in the form of a watch point may be used. Watch points are well-known. Generally, the programming environment 22 includes the capability to declare a watch point for an address/variable whereupon a system exception is generated when the address/variable is referenced (i.e., affected in a predetermined manner). In one embodiment, a thread reads or a writes to an address on which a storage watch is set. In another embodiment, the operating system or other system resource reads or a writes to the watched address. The same approach is applicable to watching a variable.

Providing thread termination identification for usage of a variable may entail the breakpoint manager 30 receiving a command such as "THIDWpt i," meaning set a thread termination watch point for variable "i". The breakpoint manager 30 would create a record in the breakpoint table 32 including the address assigned to the variable. The record would also denote this control point as pertaining to a variable. In addition, the breakpoint manager 30 would initiate setting a watch point by having the interpreter 28 enable special hardware support (available with many conventional processors) in the processor 12. During execution of the computer program 20, a system exception would occur when the variable is read and/or set. The breakpoint manager 30 would then locate the address for the system exception in the breakpoint table 32 and process as described above. However, since the system exception would be generated by a watch point rather than an invalid op code inserted into the computer program, allowing the thread to continue would not require emulating the original op code.

While the foregoing is directed to embodiments of the present invention, other and further embodiments of the invention may be devised without departing from the basic scope thereof, and the scope thereof is determined by the claims that follow.

What is claimed is:

1. A system, comprising;
   a memory containing at least operating system code, debugging code, multithreaded code, and thread termination code; and
   a processor configured to:
      execute threads of the multithreaded code;
      set a breakpoint in the thread termination code by executing the debugging code;
      initiate termination of a thread by executing the thread termination code; and
      initiate a user notification of the thread termination via a debug user interface of the debugging code, as a result of encountering the breakpoint.

2. The system of claim 1, wherein the thread termination code is part of the operating system code.

3. The system of claim 1, wherein the processor sets the breakpoint in the thread termination code as a result of receiving a user selection requesting notification of termination of a thread.

4. A method of determining thread termination within a debugging environment, comprising:
   executing threads of a multithreaded code;
   setting a breakpoint in a thread termination code by executing a debugging code;
   initiating termination of a thread by executing the thread termination code; and
   initiating a user notification of the thread termination via a debug user interface of the debugging code, as a result of encountering the breakpoint.

5. The method of claim 4, wherein the thread termination code is part of the operating system code.

6. The method of claim 4, wherein setting the breakpoint in the thread termination code comprises receiving a user selection requesting notification of termination of a thread.

7. A computer readable storage medium containing a debug program which, when executed, performs an operation for determining thread termination within a debugging environment, the operation comprising:
   executing threads of a multithreaded code;
   setting a breakpoint in a thread termination code by executing a debugging code;
   initiating termination of a thread by executing the thread termination code; and
   initiating a user notification of the thread termination via a debug user interface of the debugging code, as a result of encountering the breakpoint.

8. The computer readable storage medium of claim 7, wherein the thread termination code is part of the operating system code.

9. The computer readable storage medium of claim 7, wherein setting the breakpoint in the thread termination code comprises receiving a user selection requesting notification of termination of a thread.

* * * * *